United States Patent
Huang et al.

(10) Patent No.: US 8,866,460 B2
(45) Date of Patent: Oct. 21, 2014

(54) DYNAMIC DROPOUT CONTROL OF A POWER SUPPLY

(75) Inventors: Tsung-Wei Huang, Hsinchu County (TW); Shui-Mu Lin, Taichung County (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 193 days.

(21) Appl. No.: 13/608,091

(22) Filed: Sep. 10, 2012

(65) Prior Publication Data

US 2013/0076323 A1    Mar. 28, 2013

(30) Foreign Application Priority Data

Sep. 23, 2011   (TW) .............................. 100134336 A

(51) Int. Cl.
G05F 1/00 (2006.01)
G05F 1/46 (2006.01)
H02M 3/158 (2006.01)
H02M 1/00 (2006.01)

(52) U.S. Cl.
CPC ................. *G05F 1/46* (2013.01); *H02M 3/158* (2013.01); *H02M 2001/0045* (2013.01)
USPC ............ 323/283; 323/285; 323/274; 323/280

(58) Field of Classification Search
USPC ................. 323/222, 271, 273, 274, 275, 280, 323/281–282
See application file for complete search history.

(56) References Cited

U.S. PATENT DOCUMENTS

| 7,207,054 | B1 | 4/2007 | Richards et al. | |
| 7,834,600 | B2* | 11/2010 | Bassett et al. | 323/265 |
| 2006/0145676 | A1* | 7/2006 | Drusenthal | 323/282 |
| 2009/0085538 | A1* | 4/2009 | Miguchi et al. | 323/273 |
| 2009/0125970 | A1* | 5/2009 | Fitzpatrick et al. | 725/151 |

* cited by examiner

*Primary Examiner* — Nguyen Tran
(74) *Attorney, Agent, or Firm* — Muncy, Geissler, Olds & Lowe, P.C.

(57) ABSTRACT

A power supply uses a power converter to generate a regulated voltage by referencing to a first DC voltage, a low dropout (LDO) regulator to generate an output voltage from the regulated voltage by referencing to a second DC voltage, and a reference voltage generator to dynamically adjust the first DC voltage according to the input voltage and the control voltage of the output transistor of the LDO regulator. The dropout voltage of the LDO regulator can be minimized to maintain the high efficiency of the power supply at different loading or selected output voltages.

18 Claims, 5 Drawing Sheets

DYNAMIC DROPOUT CONTROL OF A POWER SUPPLY

FIELD OF THE INVENTION

The present invention is related generally to a power supply and, more particularly, to dynamic dropout control of a power supply.

BACKGROUND OF THE INVENTION

U.S. Pat. No. 7,207,054 issued to Richards et al. discloses a power supply for low noise block converter (LNB) as shown in FIG. 1 hereof, in which a power converter 10 converts an input voltage Vin into a regulated voltage Vreg for a linear amplifier 12, a reference voltage generator 14 provides a direct-current (DC) voltage Vref for the power converter 10 and the linear amplifier 12, a signal generator 16 provides an analog alternating-current (AC) tone signal superposed on the DC voltage Vref by switching a switch SW with a signal φ1, and the linear amplifier 12 generates an output voltage Vlnb from the regulated voltage Vreg by referencing to the DC voltage Vref, so that the output voltage Vlnb has a DC level equal to the Vref and is modulated by the analog AC tone signal. The DC voltage Vref is selected from a plurality of preset DC voltages according to the desired output voltage Vlnb, and is added with a preset amount ΔV to determine the regulated voltage $$Vreg = Vref + \Delta V. \quad [\text{Eq-1}]$$

In this art, however, at different loading or selected output voltage Vlnb, the linear amplifier 12 has a constant dropout voltage $$\begin{aligned} Vdropout &= Vreg - Vlnb \\ &= (Vref + \Delta V) - Vref \\ &= \Delta V, \end{aligned} \quad [\text{Eq-2}]$$

and thus has higher power consumption and thereby poor efficiency.

SUMMARY OF THE INVENTION

An objective of the present invention is to provide dynamic dropout control of a power supply.

Another objective of the present invention is to provide circuit and method to maintain the high efficiency of a power supply at different loading.

A further objective of the present invention is to provide circuit and method to maintain the high efficiency of a power supply at different selected output voltage.

According to the present invention, circuit and method for a power supply use a power converter to generate a regulated voltage by referencing to a first DC voltage, a low dropout (LDO) regulator to generate an output voltage from the regulated voltage by referencing to a second DC voltage, and a reference voltage generator to dynamically adjust the first DC voltage according to the voltages at an input terminal and a control terminal of an output transistor of the LDO regulator, to thereby adjust the regulated voltage.

By dynamically adjusting the first DC voltage to adjust the regulated voltage, the dropout voltage of the LDO regulator can be minimized, thereby reducing the power consumption, improving the efficiency, and maintaining the high efficiency of the power supply at different loading or selected output voltage.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
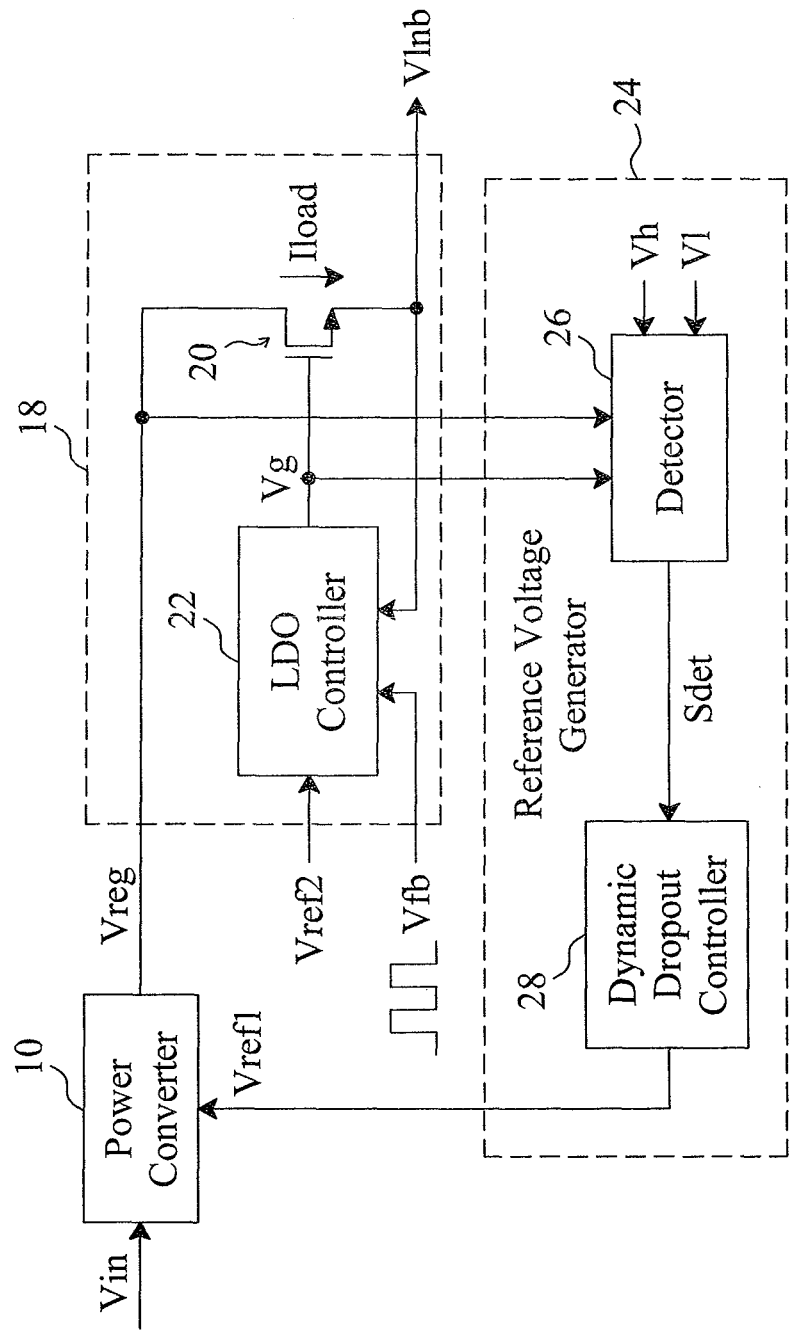
FIG. 2 is an embodiment of an LNB power supply according to the present invention.

Referring to an embodiment according to the present invention as shown in FIG. 2, a power supply includes a power converter 10 to convert an input voltage Vin into a regulated voltage Vreg by referencing to a first DC voltage Vref1, a low dropout (LDO) regulator 18 having an output transistor 20 whose input terminal receives the regulated voltage Vreg, and an LDO controller 22 to generate a control voltage Vg by referencing to a second DC voltage Vref2 that is applied to a control terminal of the output transistor 20 to control the output transistor 20 to generate an output voltage Vlnb at an output terminal, and a reference voltage generator 24 to dynamically adjust the first DC voltage Vref1 according to the regulated voltage Vreg and the control voltage Vg, to thereby adjust the regulated voltage Vreg. The same as a typical LDO regulator, the output voltage Vlnb is fed back to the LDO controller 22 for output control; however, in addition thereto, the AC tone signal Vfb, of 22 KHz for example, extracted from the LNB system is also fed back to the LDO controller 22, to modulate the control voltage Vg to thereby modulate the output voltage Vlnb, so that the output voltage Vlnb has a DC level equal to Vref2, and the dropout voltage $$\begin{aligned} Vdropout &= Vreg - Vlnb \\ &= V(Vref1) - Vref2. \end{aligned} \quad [\text{Eq-3}]$$

Thus, by dynamically adjusting the first DC voltage Vref1, the dropout voltage Vdropout of the LDO regulator 18 can be minimized. Under a loading current Iload, the LDO regulator 18 consumes power $$P = Iload \times Vdropout. \quad [\text{Eq-4}]$$

For different loading current Iload or output voltage Vlnb, the dropout voltage Vdropout can be minimized, thereby reducing the power consumption and improving the efficiency.

In the embodiment shown in FIG. 2, a MOSFET is used as the output transistor 20, and thus, of the MOSFET, the source voltage is the regulated voltage Vreg, the gate voltage is the control voltage Vg, and the drain voltage is the output voltage Vlnb. The reference voltage generator 24 adjusts the first DC voltage Vref1 to control the source-gate voltage Vsg of the MOSFET, i.e., the difference between the regulated voltage Vreg and the control voltage Vg, to be within a preset range, thereby controlling the dropout voltage Vdropout within a preset range. In the embodiment shown in FIG. 2, the reference voltage generator 24 includes a detector 26 to detect the difference Vsg between the input voltage Vreg and the control voltage Vg of the output transistor 20, and to compare it to a first threshold voltage Vh and a second threshold voltage Vl, respectively, to generate a detection signal Sdet, and a dynamic dropout controller 28 to adjust the first DC voltage Vref1 according to the detection signal Sdet, to thereby control the difference Vsg within a range between Vh and Vl. For example, when Vsg increases to be larger than Vh, the detection signal Sdet indicates a downward command to signal the dynamic dropout controller 28 to decrease the first DC voltage Vref1, thereby decreasing the regulated voltage Vreg; when Vsg decreases to be smaller than Vl, the detection signal Sdet indicates an upward command to signal the dynamic dropout controller 28 to increase the first DC voltage Vref1, thereby increasing the regulated voltage Vreg; and when Vsg is between Vh and Vl, the first DC voltage Vref1 remains unchanged.

Figure 3:
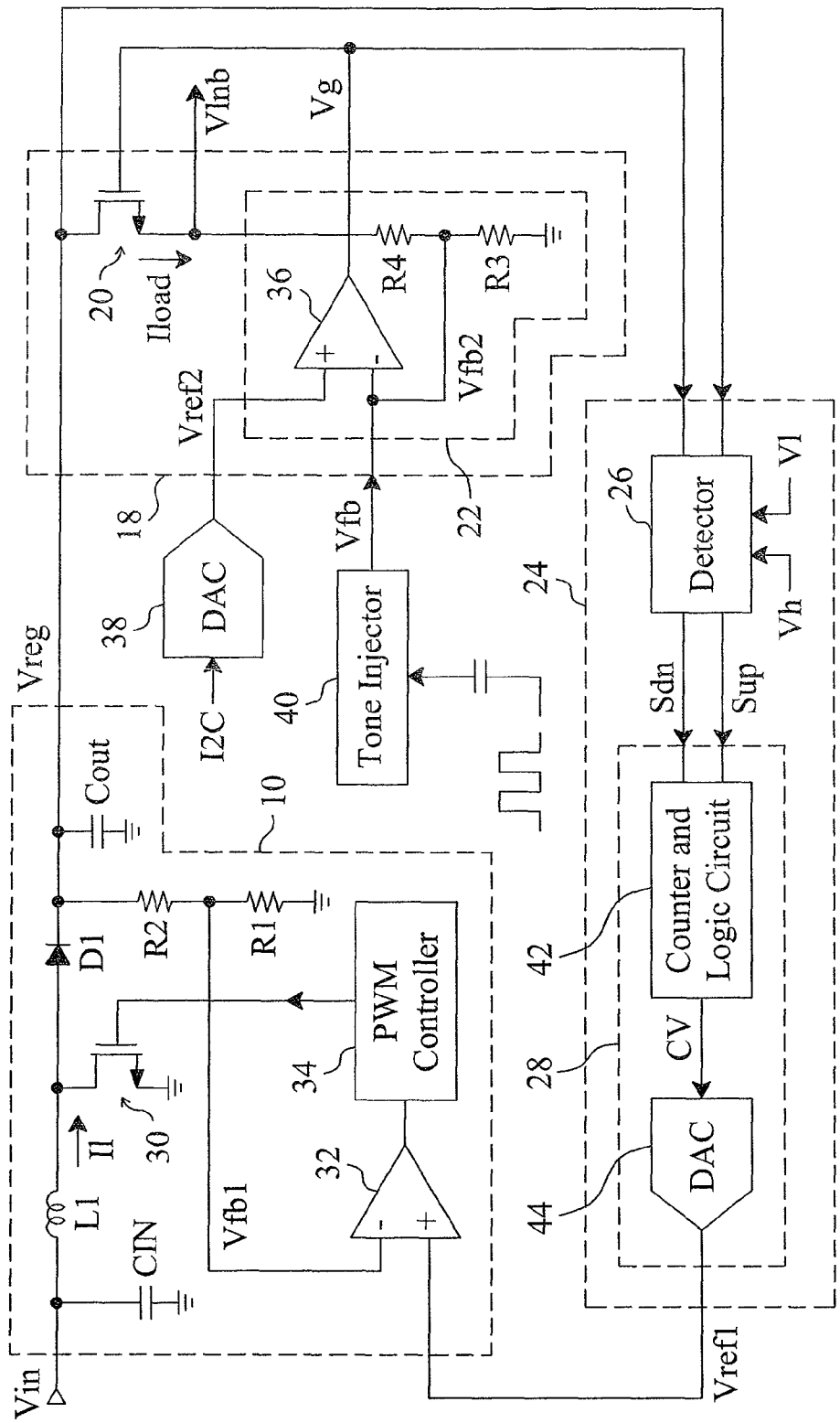
FIG. 3 is a circuit diagram of an embodiment for the LNB power supply shown in FIG. 2.

FIG. 3 is a circuit diagram of an embodiment for the LNB power supply shown in FIG. 2. The power converter 10 uses a DC-to-DC boost converter to step up the input voltage Vin to the regulated voltage Vreg. In further details, the DC-to-DC boost converter includes an inductor L1 and a power switch 30 connected in series between the power input terminal Vin and a ground terminal, a diode D1 connected between the inductor L1 and the power output terminal Vreg to prevent reverse current, resistors R1 and R2 serially connected between the power output terminal Vreg and a ground terminal to establish a voltage divider to divide the regulated voltage Vreg to thereby generate a feedback voltage Vfb1 representative of the DC level of the regulated voltage Vreg, and an error amplifier 32 connected to the resistor voltage divider and the reference voltage generator 24 to amplify the difference between the first DC voltage Vref1 and the feedback voltage Vfb1 to generate an error signal, for a PWM controller 34 to generate a PWM signal to switch the power switch 30, thereby controlling the inductor current I1. It is appreciated that, in addition to the embodiment shown in FIG. 3, the power converter 10 may use any other type of power converter, such as switching power converter based on an inductor, a power switch and a PWM controller, as is well known. In the LDO regulator 18, the LDO controller 22 includes resistors R3 and R4 serially connected between the output terminal Vlnb of the power supply and a ground terminal to establish a voltage divider to divide the output voltage Vlnb to thereby generate a feedback voltage Vfb2 representative of the DC level of the output voltage Vlnb, for being injected into a negative input terminal of an operational amplifier 36, the operational amplifier 36 has a positive input terminal to receive the second DC voltage Vref2 and an output terminal to provide the control voltage Vg, and the AC tone signal Vfb is injected into the negative input terminal of the operational amplifier 36 to modulate the feedback voltage Vfb2 and thereby modulate the control voltage Vg. It is appreciated that this embodiment may be modified to inject the inverted AC tone signal Vfb into the positive input terminal of the operational amplifier 36 to modulate the second DC voltage Vref2 instead, for the same purpose of modulating the control voltage Vg. By using a digital-to-analog converter (DAC) 38 as interface, a digital setting signal I²C is converted into an analog voltage as the second DC voltage Vref2.

When the output voltage Vlnb is desired to have a different DC level, it is only required to change the digital setting signal I²C to thereby properly set the second DC voltage Vref2. Through a capacitor, an AC tone signal of the LNB system is coupled to a tone injector 40 that is an element originally included in the LNB system, to generate the AC tone signal Vfb to be injected into the operational amplifier 36.

Figure 4:
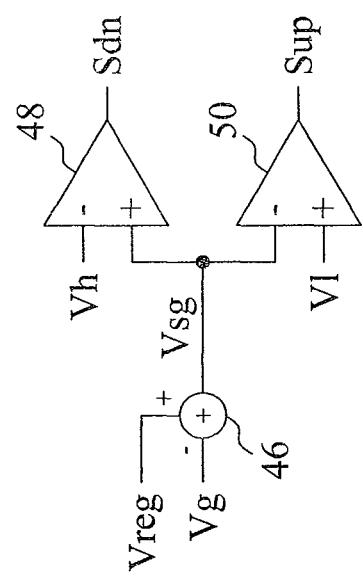
FIG. 4 is a circuit diagram of an embodiment for the detector shown in FIG. 3.

FIG. 4 is a circuit diagram of an embodiment for the detector 26 shown in FIG. 3, in which a combiner 46 subtracts Vg from Vreg to produce Vsg, a comparator 48 compares Vsg to Vh and asserts the downward signal Sdn when Vsg>Vh, and a comparator 50 compares Vsg to Vl and asserts the upward signal Sup when Vsg<Vl. Referring back to FIG. 3, the dynamic dropout controller 28 includes a counter and logic circuit 42, which counts down when the downward signal Sdn is logic 1, and counts up when the upward signal Sup is logic 1, thereby decreasing or increasing a count value CV, or remaining the count value CV unchanged according to the state of the detection signal (Sdn, Sup), and a digital-to-analog converter (DAC) 44 to convert the count value CV into the first DC voltage Vref1.

In the embodiment shown in FIG. 3, the power converter 10 generates the regulated voltage $$Vreg = Vref1 \times \left(1 + \frac{R2}{R1}\right), \qquad \text{[Eq-5]}$$

and the LDO regulator 18 generates the output voltage $$Vlnb = Vref2 \times \left(1 + \frac{R4}{R3}\right), \qquad \text{[Eq-6]}$$

and thus the LDO regulator 18 has the dropout voltage $$\begin{aligned} Vdropout &= Vreg - Vlnb \qquad \text{[Eq-7]} \\ &= Vref1 \times \left(1 + \frac{R2}{R1}\right) - Vref2 \times \left(1 + \frac{R4}{R3}\right), \end{aligned}$$

and thereby the power consumption $$\begin{aligned} P &= Iload \times Vdropout \qquad \text{[Eq-8]} \\ &= Iload \times \left[Vref1 \times \left(1 + \frac{R2}{R1}\right) - Vref2 \times \left(1 + \frac{R4}{R3}\right)\right]. \end{aligned}$$

Figure 1:
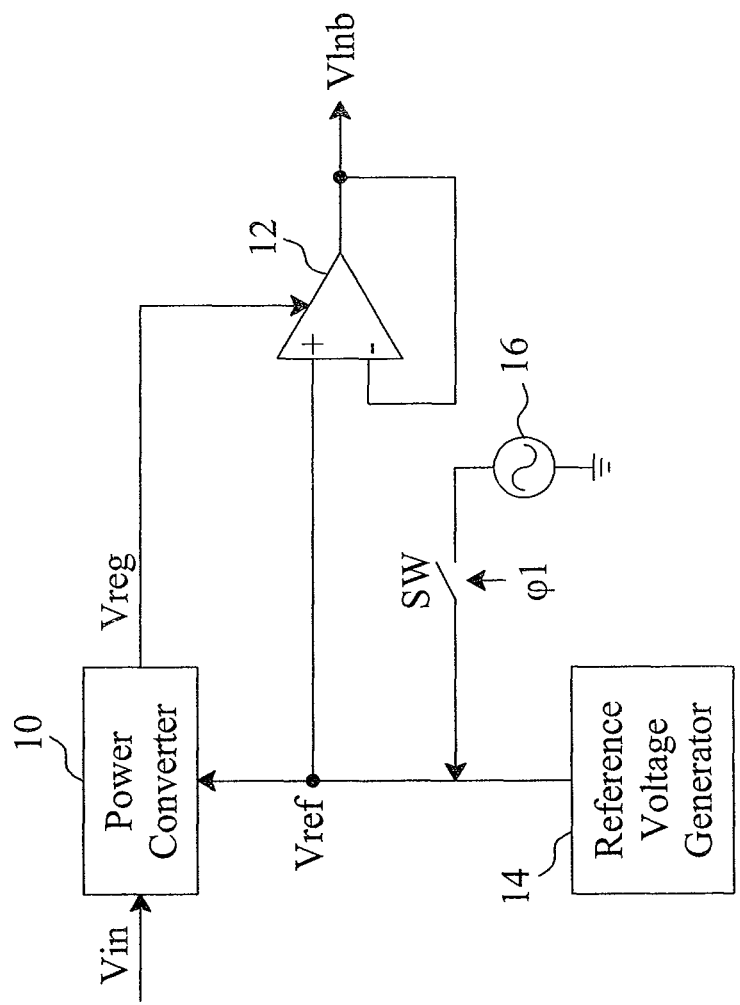
FIG. 1 is a block diagram of a conventional LNB power supply.
Figure 5:
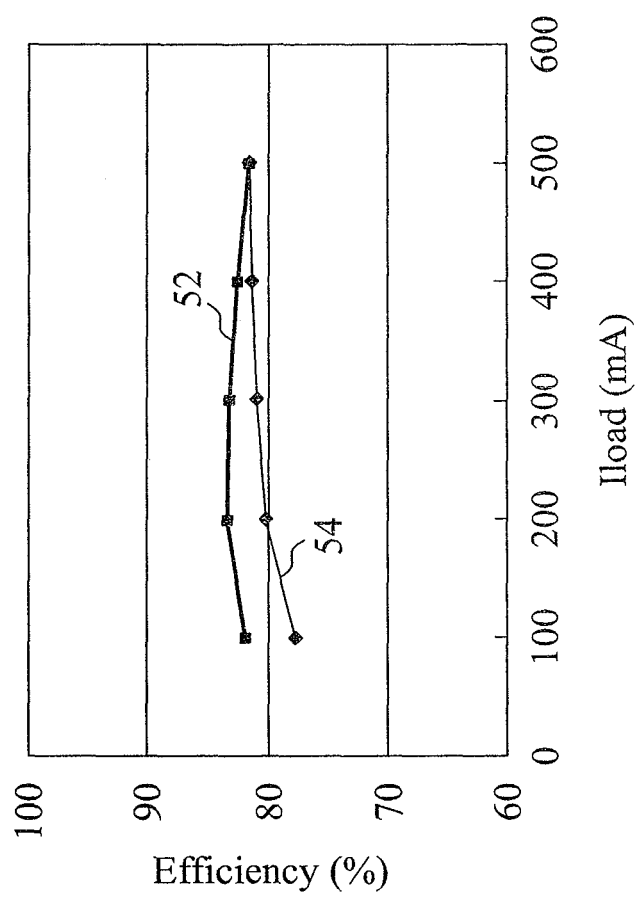
FIG. 5 is a diagram depicting the efficiency of the LNB power supplies shown in FIG. 1 and FIG. 3.

FIG. 5 is a diagram depicting the efficiency of the LNB power supplies shown in FIG. 1 and FIG. 3, where the abscissa represents the loading current Iload, and the ordinate represents the overall efficiency of the power supply, including the boost power converter 10 and the LDO regulator 18. The curve 52 represents the efficiency of the circuit shown in FIG. 3, and the curve 54 represents the efficiency of the circuit shown in FIG. 1. By comparing the curves 52 and 54, it is clear that the power supply according to the present invention maintains high efficient at different loading current Iload, and gains more significant improvement in efficiency over the conventional circuit especially at low loading.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power supply comprising:
a power converter operative to convert an input voltage into a regulated voltage by referencing to a first DC voltage;
a low dropout (LDO) regulator including an output transistor having an input terminal receiving the regulated voltage, a control terminal receiving a control voltage, and an output terminal sourcing an output voltage, and an LDO controller generating the control voltage by referencing to a second DC voltage, and modulating the control voltage responsive to an AC tone signal; and
a reference voltage generator connected to the power converter and the LDO regulator, configured to adjust the first DC voltage according to the regulated voltage and the control voltage,
wherein the reference voltage generator comprises:
a detector connected to the input terminal and the control terminal of the output transistor, configured to compare a difference between the regulated voltage and the control voltage to a first threshold and a second threshold, respectively, to determine a detection signal; and
a dynamic dropout controller connected to the detector, responsive to the detection signal to adjust the first DC voltage.

2. The power supply of claim 1, wherein the reference voltage generator controls the first DC voltage such that the regulated voltage and the control voltage have a difference within a preset range.

3. The power supply of claim 1, wherein the detector comprises:
a first comparator configured to compare the difference between the regulated voltage and the control voltage to the first threshold, to thereby assert a downward signal; and
a second comparator configured to compare the difference between the regulated voltage and the control voltage to the second threshold, to thereby assert an upward signal.

4. The power supply of claim 1, wherein the dynamic dropout controller comprises:
a counter and logic circuit connected to the detector, configured to generate a count value according to the detection signal; and
a digital-to-analog converter connected to the counter and logic circuit, configured to convert the count value into the first DC voltage.

5. The power supply of claim 4, wherein the detection signal has a first state for signaling the counter and logic circuit to increase the count value, a second state for signaling the counter and logic circuit to decrease the count value, and a third state for signaling the counter and logic circuit not to change the count value.

6. The power supply of claim 1, wherein the LDO controller comprises:
a voltage divider connected to the output terminal of the output transistor, configured to divide the output voltage to thereby generate a feedback voltage representative of a DC level of the output voltage; and
an operational amplifier having a first input terminal receiving the second DC voltage, a second input terminal receiving the feedback voltage, and an output terminal generating the control voltage, wherein the AC tone signal is injected into the first or second input terminal of the operational amplifier.

7. The power supply of claim 1, wherein the power converter comprises:
an inductor;
a power switch connected to the inductor;
a pulse width modulation (PWM) controller connected to the power switch, configured to generate a PWM signal according to an error signal to switch the power switch, thereby controlling a current of the inductor;
a voltage divider configured to divide the regulated voltage to thereby generate a feedback voltage representative of a DC level of the regulated voltage; and
an error amplifier connected to the PWM controller and the voltage divider, configured to amplify a difference between the first DC voltage and the feedback voltage to thereby generate the error signal.

8. The power supply of claim 1, further comprising a digital-to-analog converter connected to the LDO regulator, configured to convert a digital setting signal into the second DC voltage.

9. The power supply of claim 1, further comprising a tone injector connected to the LDO regulator, configured to generate a feedback signal representative of the AC tone signal to be provided to the LDO controller.

10. A method for dynamic dropout control of a power supply, comprising:
a) converting an input voltage into a regulated voltage by referencing to a first DC voltage;
b) generating a control voltage by referencing to a second DC voltage;
c) generating an output voltage from the regulated voltage by a transistor which has an input terminal receiving the regulated voltage, a control terminal receiving the control voltage, and an output terminal sourcing the output voltage;
d) modulating the control voltage responsive to an AC tone signal, for modulating the output voltage;
e) detecting a difference between the regulated voltage and the control voltage;
f) decreasing the first DC voltage when the difference between the regulated voltage and the control voltage is greater than a first threshold; and
g) increasing the first DC voltage when the difference between the regulated voltage and the control voltage is smaller than a second threshold.

11. The method of claim 10, wherein the first DC voltage is controlled such that the difference between the regulated voltage and the control voltage is within a preset range.

12. A method for dynamic dropout control of a power supply, comprising:
a) converting an input voltage into a regulated voltage by referencing to a first DC voltage;
b) generating a control voltage by referencing to a second DC voltage;
c) generating an output voltage from the regulated voltage by a transistor which has an input terminal receiving the regulated voltage, a control terminal receiving the control voltage, and an output terminal sourcing the output voltage;
d) modulating the control voltage responsive to an AC tone signal, for modulating the output voltage;
e) detecting a difference between the regulated voltage and the control voltage;
f) comparing the difference between the regulated voltage and the control voltage to a first threshold and a second threshold, respectively, for generating a detection signal; and
g) adjusting the first DC voltage responsive to the detection signal.

13. The method of claim 11, wherein the step G comprises:
adjusting a count value responsive to the detection signal; and
converting the count value into the first DC voltage.

14. The method of claim 10, wherein the step C comprises:
generating a feedback voltage representative of a DC level of the output voltage; and
generating the control voltage according to a difference between the second DC voltage and the feedback voltage.

15. The method of claim 14, wherein the step D comprises modulating the feedback voltage or the second DC voltage with the AC tone signal to thereby modulate the control voltage.

16. The method of claim 11, wherein the step G comprises controlling the first DC voltage such that the difference between the regulated voltage and the control voltage is within a preset range.

17. The method of claim 11, wherein the step C comprises:
generating a feedback voltage representative of a DC level of the output voltage; and
generating the control voltage according to a difference between the second DC voltage and the feedback voltage.

18. The method of claim 17, wherein the step D comprises modulating the feedback voltage or the second DC voltage with the AC tone signal to thereby modulate the control voltage.

* * * * *